(12) United States Patent
Mo

(10) Patent No.: US 9,377,938 B2
(45) Date of Patent: *Jun. 28, 2016

(54) LIVE VIDEOCAST TO SOCIAL NETWORK

(71) Applicant: Google Inc., Mountain View, CA (US)

(72) Inventor: Vincent Mo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/456,879

(22) Filed: Aug. 11, 2014

(65) Prior Publication Data

US 2015/0067543 A1 Mar. 5, 2015

Related U.S. Application Data

(63) Continuation of application No. 13/589,365, filed on Aug. 20, 2012, now Pat. No. 8,817,065.

(51) Int. Cl.
| | |
|---|---|
| H04N 7/14 | (2006.01) |
| G06F 3/0484 | (2013.01) |
| G06Q 50/00 | (2012.01) |
| H04L 29/06 | (2006.01) |
| H04W 4/20 | (2009.01) |
| H04L 12/58 | (2006.01) |
| H04L 12/18 | (2006.01) |
| H04L 12/815 | (2013.01) |
| H04L 29/08 | (2006.01) |

(52) U.S. Cl.
CPC ........ G06F 3/04842 (2013.01); G06F 3/04847 (2013.01); G06Q 50/01 (2013.01); H04L 12/1827 (2013.01); H04L 47/22 (2013.01); H04L 51/32 (2013.01); H04L 63/101 (2013.01); H04L 65/4069 (2013.01); H04L 65/60 (2013.01); H04L 65/602 (2013.01); H04N 7/147 (2013.01); H04W 4/206 (2013.01); H04L 67/306 (2013.01)

(58) Field of Classification Search
CPC combination set(s) only.
See application file for complete search history.

(56) References Cited

U.S. PATENT DOCUMENTS

| | | |
|---|---|---|
| 2007/0255807 A1 | 11/2007 | Hayashi et al. |
| 2009/0249244 A1 | 10/2009 | Robinson et al. |
| 2011/0047182 A1 | 2/2011 | Shepherd et al. |
| 2011/0047463 A1 | 2/2011 | Shepherd et al. |
| 2012/0023425 A1 | 1/2012 | Hackborn et al. |
| 2012/0039513 A1 | 2/2012 | Kennedy et al. |
| 2012/0198497 A1 | 8/2012 | Chan et al. |

Primary Examiner — Joseph J Nguyen
Assistant Examiner — Phung-Hoang J. Nguyen
(74) Attorney, Agent, or Firm — IP Spring

(57) ABSTRACT

In some implementations, a method includes receiving a selection of one or more users of a social networking service, the selection received via a social networking interface. A live visual data feed derived from a camera is received, where the received live visual data feed has a multiple frames and has a time interval between successive frames of the live visual data feed. A modified live visual data feed is sent over a network to be distributed using the social networking service to the selected users of the social networking service. The modified live feed includes frames derived from the frames of the received live visual data feed, and the modified feed provides a different time interval between its successive frames than the time interval between the frames of the received live feed.

18 Claims, 8 Drawing Sheets

LIVE VIDEOCAST TO SOCIAL NETWORK

CROSS-REFERENCE TO RELATED APPLICATIONS

This application is a continuation of U.S. application Ser. No. 13/589,365, filed Aug. 20, 2012, the disclosure of which is expressly incorporated herein by reference in its entirety.

BACKGROUND

Social network systems and services have become increasingly popular for use over wide-area computer networks such as the Internet. Internet-based social networking services provide digital mediums for users to interact with one another and share information. For example, users of a social network service can upload and distribute digital content, such as textual comments, digital still images, digital video files, digital audio files, hyperlinks to websites, etc., to other users whom they might be connected with in the social networking system. Digital content that is distributed to a user can be displayed to the user and commented upon by the user.

SUMMARY

Aspects of the present application relate to distributing digital content within a social networking system. In some implementations, a method includes receiving a selection of one or more users of a social networking service, the selection received via a social networking interface. A live visual data feed derived from a camera is received, where the received live visual data feed has a multiple frames and has a time interval between successive frames of the live visual data feed. A modified live visual data feed is sent over a network to be distributed using the social networking service to the selected users of the social networking service. The modified live feed includes frames derived from the frames of the received live visual data feed, and the modified feed provides a different time interval between its successive frames than the time interval between the frames of the received live feed.

In various implementations of the above method, the received live visual data feed is provided from the camera and received by a client device that sends the modified live visual data feed to a server system implementing the social networking service. The received live visual data feed can be a live video feed captured by a video camera, e.g., in which the frames are video frames. The received live visual data feed can be a time lapsed still image feed including still image frames and having a still image content type and not a video content type. In an example, a client device can receive the received live visual data feed as a video feed, and form the modified live visual data feed as a time lapsed still image feed by obtaining still images from the video feed, where the modified live visual data feed is sent to a server system to be distributed. In another example, a server system can receive the received live visual data feed over the network from a sending client device in communication with the camera, where the server system distributes the modified live visual data feed to the one or more users.

In some implementations of the above method, bandwidth conditions are detected over the network and the received live visual data feed is modified to create the modified live visual data feed based on the detected bandwidth conditions, providing a different time interval between the still image frames of the modified live visual data feed. In response to the detected bandwidth being below a predetermined threshold bandwidth, the received live visual data feed can be modified such that the modified live visual data feed has a longer time interval between its frames than between the frames of the received feed. In response to the detected bandwidth increasing above the predetermined threshold bandwidth after falling below the threshold, the received live visual data feed can be modified such that the modified feed has a shorter time interval between its frames than the longer time interval. A plurality of property settings can be received via the social networking interface, and the received live visual data feed can be modified to create the modified feed based on the property settings and provide a different time interval between the frames of the modified feed, where the received property settings are provided by at least one of a publishing user originating the received live visual data feed, and the selected one or more users. The property settings can include a start time for starting a broadcast of the modified feed to the one or more users, a stop time for ending the broadcast, a time interval at which the broadcast is updated, and/or a location in the social networking interface where the modified feed is displayed.

An access list can be generated and include the one or more users, where the access list is associated with the modified feed. At least one of the one or more users can be included within one or more social groupings created by a publishing user of a client device that generates the received live visual data feed. A second selection of one or more users can be received via the social networking interface, a second received live visual data feed can be received from a second camera, and a second modified live visual data feed can be sent over the network to the second selection of one or more users, where the second modified feed is based on the second received live feed. A second, different selection of one or more users can be received via the social networking interface, and a second modified feed can be sent over the network to the second selection of users, where the second modified feed is based on the received live feed.

In some implementations, a method includes receiving a selection of one or more users of a social networking service, where the selection is based on user input provided via a social networking interface. Property settings are received via the social networking interface and are associated with a received live visual data feed. The received live visual data feed is received over a network and is derived from a video camera. The received live visual data feed includes a plurality of frames having a time interval between the frames. The method includes determining that bandwidth is reduced over the network. A modified live visual data feed is sent over the network using the social networking service to be distributed to the one or more users via the social networking service. The modified live visual data feed includes still image frames derived from the frames of the received live visual data feed, where the modified live visual data feed provides a different time interval between its successive still image frames than the time interval between the frames of the received feed. The longer time interval is based on the detected bandwidth over the network.

In some implementations, a system includes a computing device and a computer-readable medium coupled to the computing device and having instructions stored thereon which, when executed by the computing device, cause the computing device to perform operations. The operations include receiving a selection of one or more users of a social networking service, the selection received via a social networking interface. A live visual data feed derived from a camera is received, the received live feed having a plurality of frames and having a time interval between successive frames of the feed. A modified live visual data feed is sent over a network to be distributed using the social networking service to the one or more users of the social networking service. The modified live feed includes frames derived from the frames of the received live visual data feed, and the modified live visual data feed provides a different time interval between its successive frames than the time interval between the frames of the received live visual data feed. In some implementations, the received live visual data feed is a live video feed in which the frames are video frames, and the modified live visual data feed is a live time lapsed image feed in which the frames are still image frames. Operations can further include detecting bandwidth conditions over the network, and modifying the received live visual data feed to create the modified live visual data feed based on the detected bandwidth conditions to provide a different time interval between the still image frames of the modified feed.

DETAILED DESCRIPTION

Figure 1:
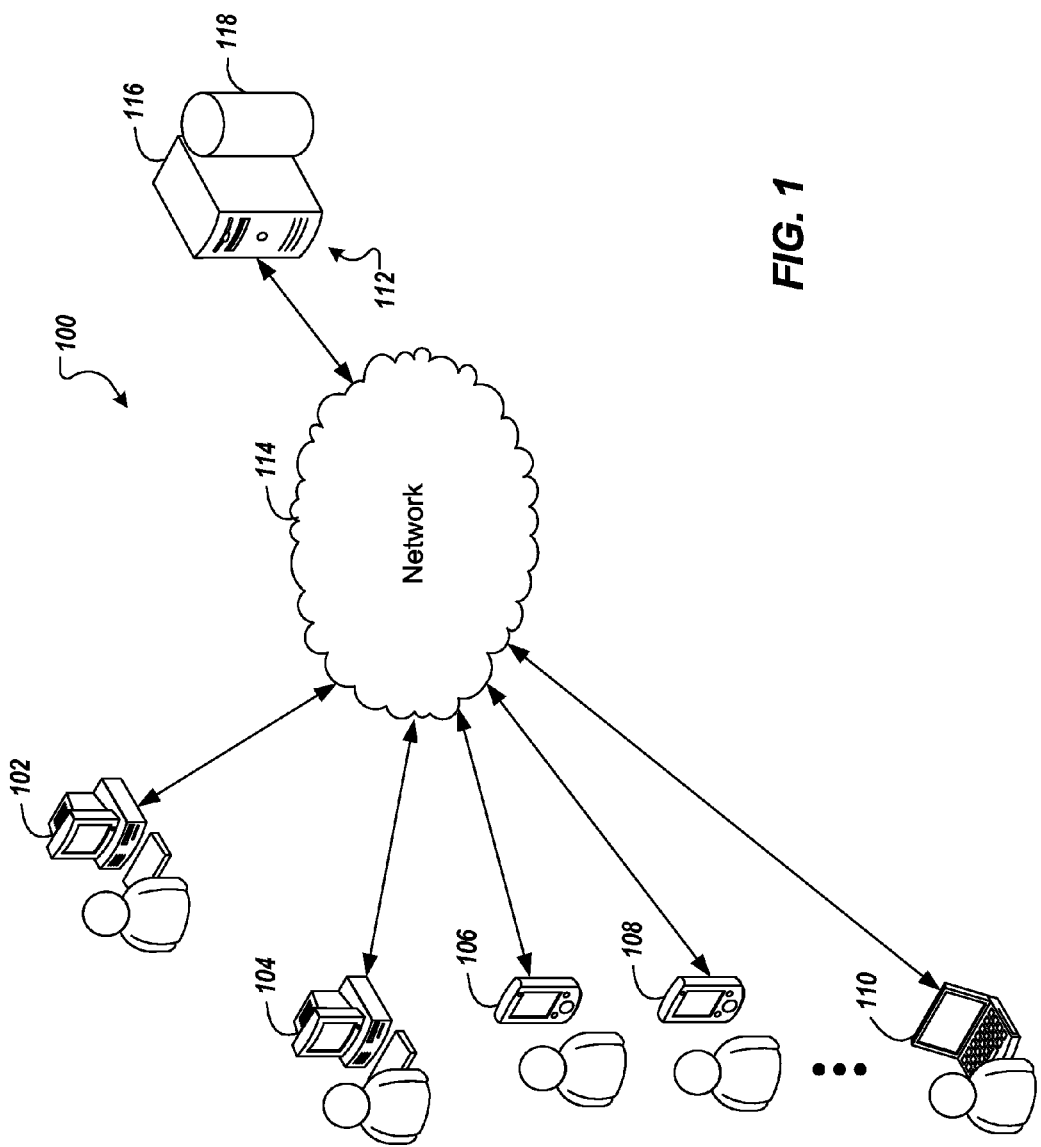
FIG. 1 is a diagram of an example network architecture.

One or more implementations described herein relate to broadcasting live video (also referred to as videocasting) using a social networking system. For example, some implementations are related to distributing one or more live videocasts to one or more users using a social networking service. In some implementations, the live videocast is broadcast as a live video feed in a social networking interface generated by a video camera of a publishing user and made available to one or more receiving users or social groupings identified by the publishing user. Some implementations allow the live videocast to be sent as or changed to a time lapsed still image feed that intermittently displays still images to the user derived from video frames of a live video data stream. In some examples, the time interval between broadcast still image frames can be determined based on available bandwidth over a network and/or property settings from users. For example, this can allow live videocasts to be published within a social networking service even if network bandwidth is reduced from high traffic or other poor transmission conditions.

A user may desire to broadcast a live videocast to other users of a social networking system. The live videocast is a stream or feed of continuously updated digital data, also referred to as a "visual data feed" or "visual data stream" herein. In some implementations, the visual data feed can be any of different types. In some examples, the visual data feed can be a video feed, which is a well-known type of data that includes multiple individual frames transmitted and displayed in succession at a particular frame rate. The visual data feed can also be a still image feed, in which visual data of an image type is displayed in successively-updated images based on live, captured visual data. For example, in some cases, providing the full video feed to a user's client device to be displayed may require more bandwidth (e.g., less latency) than is currently available over network connections. Some implementations described herein can enable a time lapsed still image feed to display still images intermittently to users in the social network interface. The still images are displayed with a longer interval than frames of the video feed, permitting much lower bandwidth use over the network.

For purposes of illustration, a live videocast can be broadcast using an example social networking service. An example social networking service can distribute and display live videocasts as described herein, e.g., to a social networking interface of particular users that the publishing user has designated. Various options allow users to customize how the live videocast is broadcast and displayed. For example, the example social networking service enables users to organize contacts into social groupings. It is appreciated, however, that implementations of the present disclosure can be used in other types of social networking services and are not limited to social networking services that include social groupings. As used herein, the terms "social network service" or "social network system" can include a software and/or hardware system that facilitates user interactions, and can include a service implemented on a network system. A "social link" is any link between multiple users that allows these users to more easily communicate, view and find statuses of the other users, and/or otherwise relay information between each other. For example, adding another user to a first user's group of known users is adding a social link between these users. In some implementations, a "user" can include one or more programs or virtual entities, as well as persons that interface with the system or network.

In general, social groupings are categories to which a user can assign contacts and better control the distribution and visibility of social networking posts and/or other digital content distributed using the social networking service. In some implementations, a social grouping can be provided as a data set defining a collection of user contacts that are associated with one another in a computer-implemented social networking system. Generally, a social grouping can be described from the perspective of an individual that is the center of a particular collection of socially interconnected people, or from the aggregate perspective of a collection of socially interconnected people. A social grouping can have narrowly defined boundaries (e.g., members of the social grouping might be familiar with one another) and permission may be required for a user to join a social grouping. A user of the social networking service can define a social grouping. The social grouping may reflect real-life social connections and/or interactions of the user. In some implementations, a social grouping can be defined by a user as a personal representation or grouping of a set of users. In some examples, the contacts may be unaware of the social grouping and/or unaware of other members included within the social grouping.

Through the creation and use of social groupings, the user can organize and categorize social networking contacts into various different groupings that can be used to control the visibility and access that those contacts have to the user's content, including postings, digital pictures, video files, audio files, hyperlinks (e.g., uniform resource indicators, URIs), and/or other content associated with the user's social networking profile. In one example, a user can post an update about a work-related nuance to only a "coworker" social group, and spare other users within the social networking system from seeing information that is irrelevant to them.

FIG. 1 illustrates a block diagram of an example network architecture 100 which may be used in some implementations to enable one or more features described herein. The network architecture 100 includes a number of client devices 102-110 communicably connected to a server system 112 and to each other by a network 114. The server system 112 includes a processing device 116 and data storage 118. The processing device 116 executes computer instructions (e.g., social network computer program code, and/or instant messaging (IM) computer program code) stored in data storage 118 to perform the functions of a social network server and/or IM server.

Users of the client devices 102-110 access the server device 112 to participate in a social networking system that implements the social networking service. For example, the client devices 102-110 can execute web browser applications that can be used to access the social networking service and/or an IM service. In another example, the client devices 102-110 can execute software applications that are specific to the social networking service and/or the IM service (e.g., social networking and/or IM "apps" running on smartphones). In various implementations, users may communicate with each other using respective client devices 102-110, and each user can receive messages and notifications via the social networking service implemented by network architecture 100. In one example, users may interact with each other via the social networking service, where respective client devices 102-110 transmit communications and data to one or more server systems such as system 112, and the server system 112 provides appropriate data to the client devices such that each client device can receive digital content uploaded to the social network system via the server system 112.

Users interacting with the client devices 102-110 can participate in the social networking service provided by the server system 112 by providing digital content, which can be data such as text comments (e.g., updates, announcements, replies), digital images, video data, audio files, a combination of these or other types, and/or other appropriate digital content. In some implementations, the content can include real-time information such as a geographical location at which one or more users of the service are currently or recently located. The content can be stored on one or more storage devices accessible to the social network system, such as on the data storage 118. In some implementations, information can be posted on a user's behalf by systems and/or services external to the social networking service or the server system 112. For example, the user may post a review of a movie to a movie review website, and with proper permissions, that website may cross-post the review to the social networking service on the user's behalf. In another example, a software application executing on a mobile device, with proper user permissions, may use global positioning system (GPS) capabilities to determine the user's location and automatically update the social network with his location (e.g., "At Home", "At Work", "In Brownsdale, Minn."). Users interacting with the client device 102-110 can also use the social networking service provided by the server system 112 to define social groupings to organize and categorize the user's relationships to other users of the social networking service. Examples of the creation and use of social groupings are described below with reference to FIG. 2.

There may be any number of client devices. In some implementations, the client devices 102-110 can be provided as computing devices such as laptop or desktop computers, portable devices, cell phones or smartphones, personal digital assistants, portable media players, tablet computers, televisions or television set top boxes, game devices, or other appropriate computing devices that can be used to communicate with an electronic social network.

In some implementations, the server system 112 can be a single computing device such as a computer server. In some implementations, the server system 112 can represent more than one computing device working together to perform the actions of a server computer (e.g., cloud computing). In some implementations, the network 114 can be a local area network (LAN), wide-area network (WAN), or other communication network. The network can be a public communication network (e.g., the Internet, cellular data network, dialup modems over a telephone network) or a private communications network (e.g., private LAN, leased lines).

In implementations providing visual data feeds as described herein, a client device can be in communication with a camera (not shown) used for capturing visual data intended to be displayed as visual images. In some examples, the client device can be coupled directly to a video camera (e.g., a web cam or other type of video camera) that is separate from the client device. For example, the client device can be in wireless communication with a video camera or can be coupled to the camera by physical wires or cables. In other examples, the client device can include an integrated video camera, such as a camera integrated in a mobile device (cell phone, tablet computer, etc.). In some examples, the video camera can record video that can be stored as a digital video file. In some examples, the digital video file can be stored in computer-readable memory that is provided in (or in communication with) the client device, and/or can be transferred for storage in the data store 118. In some examples, the video camera can provide streaming visual data, such as video data, that is continuously sent to the server system 112 immediately or soon after being captured by the camera in approximately real time, where the streaming data can be processed by the client device or not processed in various implementations. Such streaming visual data is also referred to herein as a visual data feed.

Figure 2:
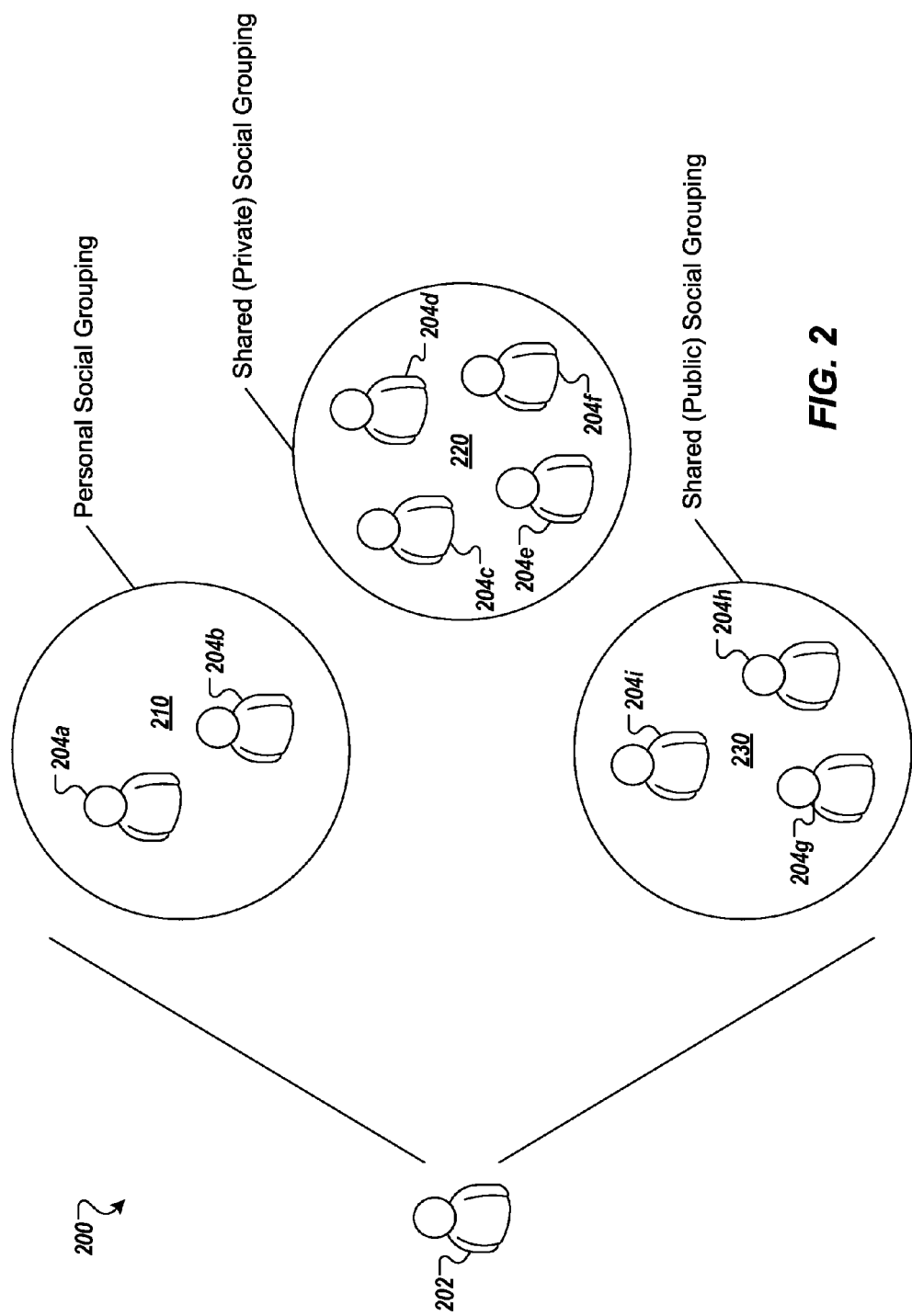
FIG. 2 is a diagram of an example social network including social groupings.

FIG. 2 is a diagram of an example social network 200 including social groupings. A user 202 is a member of a social network that supports the creation and use of social groupings (e.g., the social network provided by the server device 112 of FIG. 1). A user can designate one or more social groupings to allow user contacts in the designated social groupings to access or receive information associated with the user on the social network system. A user's social groupings each specify one or more users of the social network service with which the user has a social link, and can include friend's lists or other lists. For example, a user who is publishing content to be accessible by one or more other users ("publishing user") can designate that the users in one social grouping can access the content (e.g., receive and view the content on their client devices) which the publishing user posts on the social network system, such as text, audio, video, and/or graphical images. Or, the publishing user can designate that the users in a different user group can access user profile information of the publishing user, such as identifying information, opinions, hobbies, interests, etc. In some implementations, the access of users to user information can be designated in terms of larger groups, such as a "public" setting designating all the users of the social network service, "family," "friends," etc. Some implementations of social network services allow the user to designate social groupings of users including extended or additional social linked levels (degrees of separation) of users. For example, a publishing user may be able to designate that a second or extended linked level of users, such as friends of the publishing user's friends, are able to access the publishing user's information and content, which in this example can be any users that have at least one of the friends of the publishing user in their own social groupings. A user may also be able to designate other social groupings of users regardless of whether those other users are in the user's own listed groups. For example, the user may designate users belonging to a designated social grouping or having one or more specified characteristics, such as age, membership in a designated organization, eye color, designated hobbies or interests, member of a designated organization since a particular time or date, etc.

In the present example, the user 202 has a number of user contacts 204a-204i with which the user 202 can have some form of relationship (e.g., friends, coworkers, customers, teammates, clients, relatives, club members, classmates). The user 202 categorizes the contacts 204a-204i by assigning them to one or more social groupings, such as a social grouping 210, a social grouping 220, and a social grouping 230. In some implementations, a social grouping that has a number of contacts is provided as a query-based social grouping that can be automatically generated without input from the user 202. Some implementations of the social networking service can generate the social grouping based on information gathered from users of the service and that has some commonality among the user 202 and the user contacts within the social grouping, such as posts, uploaded photos or other content, check-ins for geographical location, volunteered location information, etc.

In the described example, the social grouping 210 is a personal grouping. In some implementations, personal groupings are groupings created by and may be known only to the user 202. For example, the users 204a and 204b may receive no indication that they are in the user's 202 personal social grouping 210. In other implementations, personal social groupings may be known to the user 202 as well as to the user contacts (e.g., contacts 204a and 204b) that are members of the social grouping. For example, the users 204a and 204b may receive an indication that they have been added to the personal social grouping 210.

In some implementations, personal groupings may be used to organize and categorize the contacts 204a-204i in ways that are relevant or useful to the user 202. For example, the user 202 may use personal social groupings to organize contacts in order to discretely target which of his contacts 204a-204i will see certain items (e.g., postings) or have access to particular information or content. For example, the user 202 may be planning a surprise party for a small group of friends. Accordingly, the user can organize contacts into "Surprise Party Attendees" and "Surprise Party Honorees" personal groupings. By doing so, the user 202 may better target selected items to the friends attending and/or helping to plan the surprise party (i.e., Surprise Party Attendees), while targeting selected items to friends that are to be honored at the surprise party (i.e., Surprise Party Honorees) to maintain the integrity of the surprise.

Another example of a social grouping is a shared private grouping 220, which may also be referred to simply as a shared grouping. In general, shared private groupings are social groupings that the user 202 creates and to which the user 202 invites user contacts to voluntarily join. Users that accept the invitation become members of the shared private grouping. Members of a shared private grouping can see information posted to that grouping by the user 202 and can post information to be shared with other members of the shared private grouping. For example, the user 202 may tend to post a large number of jokes to the social network. The user 202 may create a "jokes" shared private grouping and invite some or all of the contacts 204a-204i to join. Only those users who have accepted the invitation are able to see the joke content posted to the "jokes" grouping by the user 202. Similarly, members of the shared private grouping are able to post messages to the grouping, and those items are visible to other members of that grouping.

Another example of a social grouping is shared public grouping 230. Shared public groupings are social groupings that the user 202 creates and to which the user 202 invites contacts to voluntarily join. Further, the existence of a shared public grouping is publicly available such that other users of the social networking service (e.g., not necessarily just the user's 202 contacts 204a-204i) may request to join the shared public grouping. Members of shared public groupings may post information to, and see updates posted by, other members of the same public shared grouping. In some implementations, public shared groupings may be "fan" or "group" groupings (e.g., groupings dedicated to a particular place, event, product, movie, celebrity, sports team, company, concept, philosophy, organization, support network, etc.). For example, the user 202 may create a shared public grouping for his music band, and fans of his act may join the grouping to discuss upcoming shows, download MP3s of the band's music, or post videos from recent concerts. In another example, the user 202 may create a shared public grouping for alumni of his high school graduating class, which his former classmates may find and join in order to stay in touch with one another and post pictures from their school days. Once a shared public grouping is created, in some implementations the user 202 can invite people to join the grouping. In some implementations, nonmembers of the grouping can request membership in the shared public grouping, and membership in a shared public grouping may be automatic upon request, or may require the user's 202 approval to become members of the shared public grouping.

As discussed herein, digital content such as visual data feeds can be made accessible to contacts within the social networking service including one or more social groupings, such that the content is exclusively viewable by the indicated contacts and/or contacts within one or more indicated social groupings. For example, a user of the social networking service can generate an item and indicate one or more social groupings for distribution of the item. In some implementations, an auto-complete component enables the user to type in part of the name of a social grouping and/or individual contact to specify which social groupings and/or individual contacts require delivery of specified item content.

After the user has specified the item and the recipients, an item data set is transmitted from the user's client computing device (e.g., client device 102 of FIG. 1) to a distribution hub, which can be provided at a server (e.g., server system 112 of FIG. 1). The item data set can include several types of data. In some implementations, the item data set includes item content data (e.g., text data, audio data, video data, uniform resource indicator (URI)), timestamp data (e.g., a timestamp indicating the time that the item was generated), distribution data (e.g., contacts and/or one or more social groupings), and identification (ID) data (e.g., an ID assigned to the item data set upon generation of the item). In some implementations, the item data set can include properties affecting the manner in which the item is shared on the client devices (e.g., client devices 102-110 of FIG. 1) of users within one or more social groupings to which the item is distributed. In some implementations, and as discussed in further detail herein, the item data sets can be associated with content including a live videocast, such as streaming visual data.

In some implementations, the distribution data in the item data is processed to provide an access control list (ACL) that specifies which user contacts within the social networking system are granted access to the item content. For example, the distribution hub can determine end points that the item data set is to be distributed to based on the ACL. In a more specific example, the system can determine the set of user contacts that may care about the item and/or that are allowed access to the item based on the ACL, and the ID of the item can be written to a per user/view index at the distribution hub. When fetching items to distribute to a requesting user, the system accesses the user/view index and determines the IDs of the various items that the user is allowed to view. The system retrieves the item data sets from data storage (e.g., data storage 118 of FIG. 1) and these are transmitted to a client device associated with the requesting user.

Figure 3:
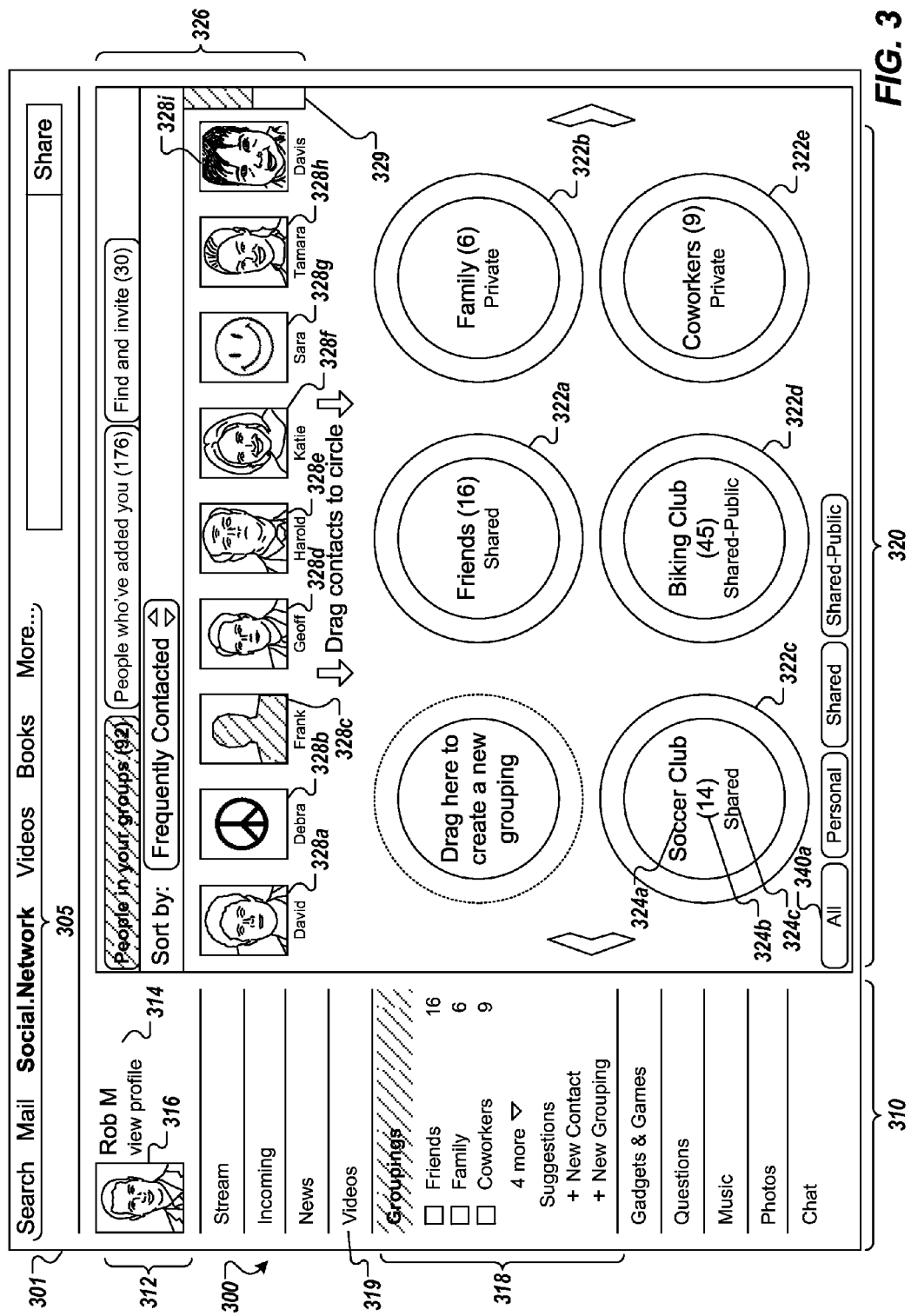
FIG. 3 is an illustration of an example graphical user interface for creating and maintaining social groupings.

FIG. 3 is an illustration of an example graphical user interface for creating and maintaining social groupings. In the screen-shot 300, a social graph editor user interface (UI) 301 is shown. GUI 301 can be displayed on a display device, e.g., of a client device 102-110, or a server system 112 in some implementations. In some implementations, the interface 301 can be downloaded from the server system 112 for display on a client device. The interface 301 can be presented by a social networking application, and/or can be one or more web pages of a social networking website displayed in a general purpose web browser or other application program. For example, in some implementations the interface can be displayed using a particular standardized format, such as in a web browser or other application as a web page provided in Hypertext Markup Language (HTML), Java™, JavaScript, Extensible Markup Language (XML), Extensible Stylesheet Language Transformation (XSLT), and/or other format.

In the example of FIG. 3, the interface 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in and interfacing user are displayed.

The social network menu 310 also displays, among other items, a social groupings sub-menu 318. The social groupings sub-menu 318, when selected (e.g., as represented by the highlighting of the submenu's title), causes a social grouping display 320 to be presented, e.g., which is displayed at the right of the menu 310 in the example of FIG. 3. The social grouping display 320 includes a number of groupings 322a-322e that are visual representations of various social groupings that the user has created or has permission to edit. Each of the groupings 322a-322e displays information about the social grouping it represents. For example, the grouping 322c displays a name 324a, a count 324b of the number of user contacts associated with the social grouping, and an indication 324c of the type of grouping 322c (e.g., personal, private shared, public shared).

The social grouping display 320 also includes a contact display 326. The contact display 326 provides a graphical interface for viewing, selecting, and organizing items in the user's contact lists. A collection of user contact icons 328a-328i represents the users or other entities (e.g., organizations, places, or other items) socially networked with the particular interfacing user. In some implementations, the icons can be digital photos of the contacts they represent (e.g., the icons 328a, 328d), arbitrary images (e.g., the icons 328b, 328g), or placeholders (e.g., when the user contact has no image associated with their account, such as the icon 328c). In some implementations, the icons can include additional information, such as the names of each user contact. A scroll bar 329 is provided for the user to view additional user contact icons that may not fit into the initial view.

In some implementations, a 'Videos' sub-menu 319 in the social network menu 310 can be used to facilitate one or more tasks including uploading a video file to data storage (e.g., the data storage 118 of FIG. 1) that is accessible to the social networking service, recording a video, streaming one or more live videocasts to one or more contacts socially networked to the user, and setting properties that affect the manner in which the video is shared with the one or more contacts.

In accordance with implementations of the present disclosure, users of a social networking service can publish live videocasts using the social networking service. In some implementations, a video camera in communication with a computing device (e.g., a client device 102-110) can capture video data that is stored in storage of a computing device, and is provided as streaming data output from the computing device that can be used to provide a live videocast. In some examples, the streaming visual data can be provided from storage on the computing device to one or more server systems (e.g., the server system 112) that host the social networking service. The one or more server systems can publish the live videocast through or using the social networking service, such that one or more users of the social networking service can access the live videocast through an interface to the social networking service. For example, a publishing user can publish streaming data feed to the social networking service, and can set permissions enabling specified users access to this live videocast. In some examples, a live videocast can include a permission that specifies one or more social groupings that are enabled access to the live videocast. Consequently, users of the social networking service that are members of the one or more social groupings can access the live videocast. The publishing user may also select particular users to enable access of those users to the live videocast through the social networking service.

In some implementations, a publishing user can publish the live videocast as an item that is distributed to one or more other users of the social networking service. In some examples, the publishing user can define an item set that is associated with the streaming data derived from a video camera. For example, the publishing user can define a distribution that causes the system to generate an ACL associated with the item set. In some examples, the distribution can include one or more users of the social networking service and/or one or more social groupings, including any of the types of social groupings as described above in some implementations. The publishing user can post the item set to the social networking service. Consequently, the one or more users defined in the ACL can receive the live video broadcast in stream pages associated with the respective users. In this manner, the live videocast can appear as a social networking content post within a stream page or activity page of a user identified in the distribution. Some implementations enable a live videocast to be displayed as an image within a document (e.g., a web page) displayed by the interface of the social networking service.

In some implementations, a publishing user can publish the live videocast as a shared video within the social networking service. For example, the publishing user can upload one or more digital video files to a video sharing interface provided in the interface of the social networking service. In this manner, designated users can access and view the digital video files. In some implementations, the publishing user can also publish a live videocast to the video sharing interface to enable users that have been granted access to the live videocast (e.g., based on an ACL associated with the live videocast) to access and view the live videocast.

Some implementations enable a publishing user to publish the live videocast to a user profile associated with the publishing user within the social networking service. In some examples, the user profile can include biographical, personal and/or professional information associated with the publishing user. In accordance with the present disclosure, the user profile can also include one or more live videocasts published by the publishing user, e.g. a live videocast can be displayed in an interface in a user profile data interface area alongside or among user profile information. In some examples, the publishing user can define one or more ACLs associated with the user profile and/or information provided in the user profile to regulate access to the user profile and/or information provided in that user profile. For example, an ACL can be associated with the user profile that identifies one or more users of the social networking service that are able to access the user profile. In some implementations, one or more ACLs can be associated with particular respective subsets of information provided in the user profile, where the one or more ACLs respectively identify one or more users of the social networking service that are able to access the information. An ACL can be associated with a live videocast that is accessible through the user profile.

Multiple ACLs can be used in some implementations to define different sets of receiving users who can access information in the social networking interface, as well as define different interface areas or methods of access. By way of non-limiting example in which multiple ACLs are used, a first ACL can be associated with the user profile and can define a plurality of users that are able to access a user profile section of the user's social networking account. A second ACL can be associated with personal information provided in the user profile and can define a sub-set of the one or more users that are able to access the personal information. A third ACL can be associated with professional information provided in the user profile and can define a sub-set of the users able to access the professional information. A fourth ACL can be associated with a live videocast provided in the user profile and can define a sub-set of the users able to access the live videocast. In some examples, at least one user of the one or more users can be provided in one or more of the first ACL, the second ACL, the third ACL and the fourth ACL.

In some implementations, a publishing user can publish multiple live videocasts using the social networking service. For example, each of the live videocasts can have an ACL associated therewith to define user access to the respective live videocast. In some examples, the multiple live videocasts can be provided as items distributed using the social networking service, as shared videos within the social networking service, and/or as live videocasts associated with a user profile within the social networking service. Some implementations can allow each live videocast to be provided as a channel that is broadcast by the publishing user. A channel can be a content item that provides streaming visual data from a particular source, such as the publishing user, and having an identified subject or topic, and/or a regular or recurring broadcast.

Some implementations allow a publishing user to set parameters or property settings governing the broadcast of one or more live videocasts. For example, a publishing user can define one or more times during which the live videocast is published and broadcast. In some examples, each live videocast can be associated with one or more durations (e.g., defined between a begin time and an end time) and one or more calendar days and/or dates. By way of non-limiting example, the publishing user can define a day and duration (e.g., from a begin time to an end time) associated with a live videocast. Consequently, the video data feed is provided for distribution using the social networking service and can be accessed by users defined in an ACL associated with the live videocast on the defined day and lasting from the begin time to the end time. A user can also define a recurrence of the live videocast in some implementations. By way of non-limiting example, the publishing user can define a frequency (e.g., every day, every other day, every week, every month, etc.) and duration (e.g., from a begin time to an end time) associated with a live videocast. Consequently, the video data feed is provided for distribution and can be accessed by the designated users on the recurring days and lasting from the begin time to the end time.

In some implementations, a publishing user can provide a plurality of live videocasts from a visual data stream provided by or otherwise derived from a video camera. In some examples, distinct live videocasts can be defined based on time periods defined for the video data stream. By way of non-limiting example, a first live videocast can be defined from a first time to a second time and a second live videocast can be defined from the second time to a third time, where the video data stream of each videocast is provided from a single video camera. In other examples, a publishing user can provide a plurality of live videocasts from visual data streams of a plurality of respective video cameras in communication with one or more computing devices such as one or more client devices 102-110. For example, the publishing user can set up a first data stream provided from a first video camera and a second data stream provided from a second video camera, where the first video camera and the second video camera can be in communication with a computing device, or in communication with respective computing devices. In some examples, the first live videocast can be associated with a first ACL and the second live videocast can be associated with a second ACL that is different from the first ACL.

Figure 4:
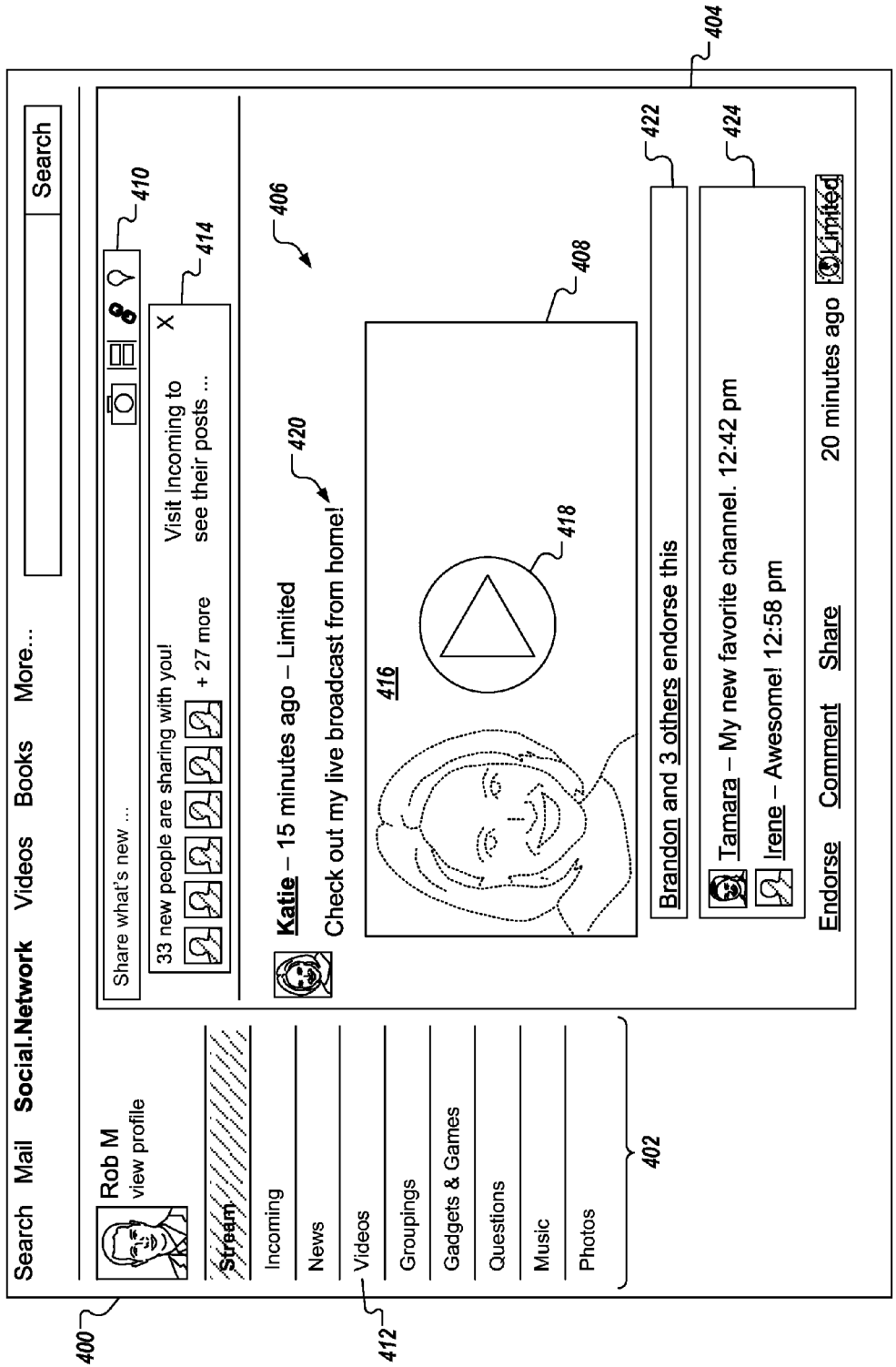
FIG. 4 is an illustration of an example stream page for a user of a social networking service.

FIG. 4 depicts an example stream page 400 for a user of a social networking service. For example, the stream page 400 can be provided as a web page within a website of a social networking service and can display digital content that has been shared with a user associated with the stream page 400. Or, the stream page 400 can be displayed in a dedicated application for the social networking service. In the illustrated example, the example user includes "Rob M," and the stream page 400 displays items (i.e., digital content or an "activity stream") that other users have shared with the user and/or items that the user has shared with other users.

The stream page 400 includes a social network menu 402 and an item region 404. Example item 406 that has been distributed to the user is displayed in the item region 404. Generally, the item 406 displayed in the item region 404 includes digital content that is distributed to the interfacing user from user contacts established within the social networking service. A content sharing interface 410 can also be provided in the item region 404. The user can activate (e.g., click on) the content sharing interface 410 to share digital content. Although one item 406 is depicted in FIG. 4, it is appreciated that the stream page 400 can display any number of items to the user.

In the example of FIG. 4, the item 406 includes a videocast element 408 that can be activated or selected to provide a live videocast or visual data feed 416 received from another user. In the example of FIG. 4, the user "Katie" has shared the live videocast 416 with the example user Rob M. In some examples, the user generating the item 406 can post comments 420 that accompany the live videocast 416. In some examples, other users with whom the user has shared the live videocast 416 can post content, such as endorsements 422 and comments 424 to the item region 404 in association with the posting of the item 406. In some examples, a start/stop button 418 is displayed within the videocast element 408 and can be activated (i.e., clicked on or selected based on user input to the system) by a user with whom the item 406 has been shared to start or end the live videocast 416. In some implementations, the item 406 can be annotated with a broadcast symbol (not shown in FIG. 4) indicating that a live feed is currently being broadcast.

In some implementations, the publishing user providing the visual data feed can set properties within the item data set of the item 406 that affect the manner in which the live videocast 416 is broadcast. In some examples, the user can access property settings by clicking on the 'Videos' sub-menu 412 within the social network menu 402. For example, the properties can be set such that the feed 416 is broadcast in real-time as a live videocast and can be displayed in the item region 404 of users included within the ACL of the item 406. Properties of the item 406 can further be set such that broadcasting of the live videocast can start and/or stop at a predetermined time. In some examples, the broadcast of the live videocast can be started at an arbitrary, non-predetermined time. Some examples enable the user generating the item 406 to start the broadcast without setting a predetermined time for the broadcast to stop and subsequently stop the broadcast at an arbitrary time.

Some implementations, the user generating the item 406 can set properties of the live videocast 416 such that the live videocast can be displayed in an item region 404 automatically upon launching of a stream page 400 of a user included within the ACL associated with the item 406. In some examples, the videocast 416 can be displayed as a single still image (i.e., generated from the live visual data feed) in the broadcast window 408 until the user included within the ACL activates the start/stop button 418 to start the live videocast in the broadcast window 408.

In some implementations, the still image can be set to update to another still image at a predetermined time interval until a user activates the start/stop button 418 to start the live video feed. For example, the live videocast can be displayed as a still image data feed until selected to become a full video data feed.

In some implementations, once the live videocast has started in the broadcast window 408, the start/stop button 418 can disappear from the broadcast window 408 while a user controlled displayed pointer (e.g., cursor or other indicator) is located outside of the broadcast window 408. Some example implementations re-display the start/stop button 418 in the broadcast window 408 while the pointer hovers over the broadcast window 408. In some examples, upon ending of a live video feed in the broadcast window 408, the feed 416 may be displayed as a still image (i.e., a particular image generated from the video feed) in the broadcast window 408 as an indication that the video feed previously started and ended.

In some examples, upon ending of the broadcast by the user generating the item 406, the feed 416, icon 418, and broadcast window 408 may no longer appear as part of the item 406, such that only the comments 420, 424, endorsements 422, or other items generated by users within the ACL of the item 406 remain displayed in the item region 404 in association with the item 406.

In some implementations, the user generating the item 406 (i.e., Katie, in the example of FIG. 4) can set properties of the item 406 such that the live videocast is broadcast as a live time lapsed image feed including a series of live still images that updates at a predetermined time interval. Some implementations can consider such still images as a different data or content type than a video feed. Similar to a live video feed broadcast, properties of the item 406 can be set by the user generating the item 406 such that broadcasting of the time lapsed image feed can start and/or stop at a predetermined time. In some examples, the time lapsed image feed can be started at an arbitrary, non-predetermined time or can be started without a predetermined time to stop and subsequently be stopped at an arbitrary time.

In some implementations, the user generating the item 406 can set properties of the feed 416 such that the time lapsed image feed is displayed in an item region 404 automatically upon launching of a stream page 400 of a user included within the ACL associated with the item 406. In some examples, the feed 416 can be displayed as a frozen, still image (i.e., acquired from the streaming data in the time lapsed image feed) in the broadcast window 408 until the user included within the ACL activates the start/stop button 418 to start the time lapsed image feed in the broadcast window 408. In some implementations, the frozen, still image can be set to update to another frozen, still image at a time interval longer than the predetermined time interval of the time lapsed image feed broadcast until a user activates the start/stop button 418 to start the time lapsed image feed. In one example, prior to a user clicking on the start/stop button 418 to start the time lapsed image feed, a frozen, still image representing the time lapsed image feed may update every 10 minutes, whereas once the time lapsed image feed is started, another image may be broadcast every minute.

In some implementations, once the time lapsed image feed has started in the broadcast window 408, the start/stop button 418 can disappear from the broadcast window 408 while a user-controlled pointer is located outside of the broadcast window 408. In some instances, the start/stop button 418 can reappear in the broadcast window 408 while the pointer hovers over the broadcast window 408. Upon ending of the time lapsed image feed in the broadcast window 408, the feed 416 may be displayed as a frozen, still image (i.e., an image acquired from the time lapsed series of images) that does not update in the broadcast window 408 as an indication that the time lapsed image feed previously started and ended.

In some instances, upon ending of the live videocast by the publishing user generating the item 406, the feed 416, start/stop button 418, and broadcast window 408 no longer are displayed as part of the item 406, such that only comments 420, 424, endorsements 422, or other items generated by users within the ACL of the item 406 remain displayed in the item region 404 in association with the item 406.

In some implementations, a user with whom the feed 416 has been shared (i.e., Rob M, in the example of FIG. 4) can set display properties that determine the manner in which the feed 416 is provided or updated in the broadcast window 408 of the user's displayed interface. In some examples, the display property settings can be accessed via the 'Videos' sub-menu 412. In some implementations, the display properties of the feed 416 can be set such that the feed 416 is started and displayed in the broadcast window 408 automatically upon launching of the user's stream page 400. In some examples, the display properties can be set such that the broadcast window 408 is not initially displayed upon the broadcast being started by the user generating the item 406, and the user with whom the feed 416 has been shared can activate or select a broadcasting symbol (not shown in FIG. 4) to launch the broadcast window 408 within the item region 404 in association with the item 406 or in a new pop up window. In some examples, a receiving user with whom the feed 416 has been shared can set the display properties such that the feed 416 is displayed in a new pop-up window when the user activates the start/stop button 418 to start the feed 416.

In some examples, the display properties associated with the item 406 can be set such that the feed 416 begins to update upon the user activating the start/stop button 418. The display properties can be set such that the feed 416 displayed in the broadcast window 408 stops streaming/updating at a predetermined time and accordingly is displayed as a single still image even while the feed 416 is still being broadcast from the publishing user and server system as live streaming data (e.g., a video feed or a time lapsed image feed). In some implementations, the still image may further be set to update to another image at a predetermined time interval while the feed 416 is still being broadcast as a live video feed or a time lapsed image feed. For example, the still image may be set to update to another image at a predetermined time interval that is longer than the time interval with which frames in a video feed or the still images in a time lapsed image feed are being broadcast by the user generating the item 406. The image which is displayed upon such an update can be the image currently being broadcast by the video feed or time lapsed image feed.

Figure 5:
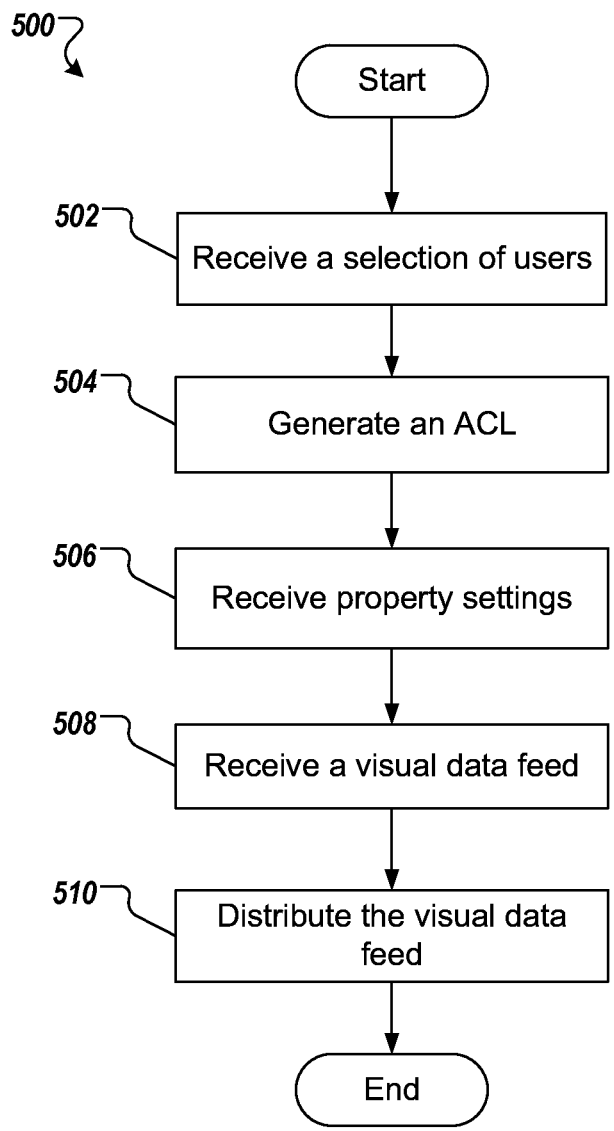
FIG. 5 is a flow diagram illustrating an example method that can be executed in implementations of the present disclosure.

FIG. 5 is a flow diagram illustrating an example method 500 that can be executed in implementations of the present disclosure. The example process 500 can be executed to broadcast and distribute a visual data feed to one or more users included within a social network service.

In some implementations, the example method 500 can include operations that are performed using one or more computer programs executed using one or more data processing apparatus (e.g., one or more client-side computing devices and/or one or more server-side computing devices). Method 500 can be implemented by program instructions or code, which can be executed by one or more processors, such as microprocessors or other processing circuitry and can be stored on a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. Alternatively, these methods can be implemented in hardware (logic gates, etc.), or in a combination of hardware and software. The method 500 can be provided as part of or component of an application running on a client device or server system, or as a separate application or software running in conjunction with other applications and operating system.

In some implementations, method 500 can be performed, for example, on a server system 112 as shown in FIG. 1. In described examples, the server system 112 includes one or more processing devices (including one or more processors or processing circuitry), and storage 118. In some implementations, different components of a server and/or different servers can perform different blocks or other parts of the method 500. For example, method 500 can be implemented on a receiving server system providing a social networking service to receiving client devices, and which can receive a visual data feed from one or more client devices. In some examples, a social networking interface can be provided by the server system and displayed within a social networking web page to a user of a social networking service accessing the social networking service via a client device. In some implementations, some or all of the method 500 can be implemented on one or more client devices, such as client devices 102-110. For example, the method 500 can be performed by a sending client device receiving a live visual data feed from a camera and sending a visual data feed over a network to a server for distribution to one or more users.

In a block 502, a selection of one or more users is received via the social networking interface, such as using a social networking menu 302 as described above. In some examples, these one or more users can be selected by a publishing user that is providing the feed from a sending client device. In some implementations, the selected users can be included within social groups and/or provided in a received ACL associated with a visual data feed. In some implementations, in a block 504, the social networking service can generate the ACL including the selected one or more users.

In a block 506, property settings associated with the visual data feed are received. For example, the property settings can be included within an item data set associated with the visual data feed. The property settings can affect the manner in which the visual data feed is provided to the one or more users included within the ACL.

In a block 508, a streaming visual data feed derived from a camera is received. In some implementations or instances, the received visual data feed is a live visual data feed that includes video type frames. In some implementations or instances, the visual data feed is a received time lapsed image feed that includes a series of still image frames. More examples of these feeds are described below with respect to FIGS. 6-7.

In a block 510, the visual data feed is distributed over a network to the one or more users included in the ACL. For example, a sending client device can send the visual data feed over a network to a server system that then distributes the visual data feed. The server system can send the visual data feed over the network to receiving client devices based on received settings or other factors. The process then ends.

For example, the social networking service can consult the ACL and property settings of blocks 504 and 502 and 506 to distribute the feed. The distribution of the feed in block 510 can include determining particular user contacts to which the feed is to be published and made accessible, the times of publication of the feed, and any other parameters governing the feed publication. In some examples, the social network service broadcasts the feed across a channel over the network. Some examples provide a social networking interface that facilitates one or more tasks such as uploading a video file to the social networking system from a sending client device, recording a video at the social networking service based on a feed provided from a sending client device, broadcasting a received video feed to specified user contacts, and/or setting properties that affect the manner in which the video feed is provided to the user contacts. In some examples, a user included within an ACL can be a user included within one or more social groupings created by the user generating the video feed. In some implementations, the property settings can include one or more of a start time for starting a video feed broadcast, a stop time for ending the video feed broadcast, a time interval at which the video feed broadcast is updated, and a location where the video feed is displayed. In some examples, the location can be a region within a content stream page or other area displayed in a social networking interface, and/or can be a region within a pop up window activated from the stream page.

In some implementations, the visual data feed is sent to all users regardless of whether the user's interface is currently displaying an area of the interface that can display the feed. In other implementations, the visual data feed is sent to a subset of the users selected by the publishing user, where the subset of users are users currently viewing an area of an interface able to display the live videocast, such as a main activity stream area, profile of the publishing user, or any particular interface area operative to display the visual data feed.

In some implementations, the video feed can be broadcast across a channel over a network to users included within multiple, respective ACLs. Some examples allow the property settings to be different for each ACL. In some implementations, a user can broadcast multiple visual data feeds across multiple, respective channels over a network to various ACLs.

Figure 6:
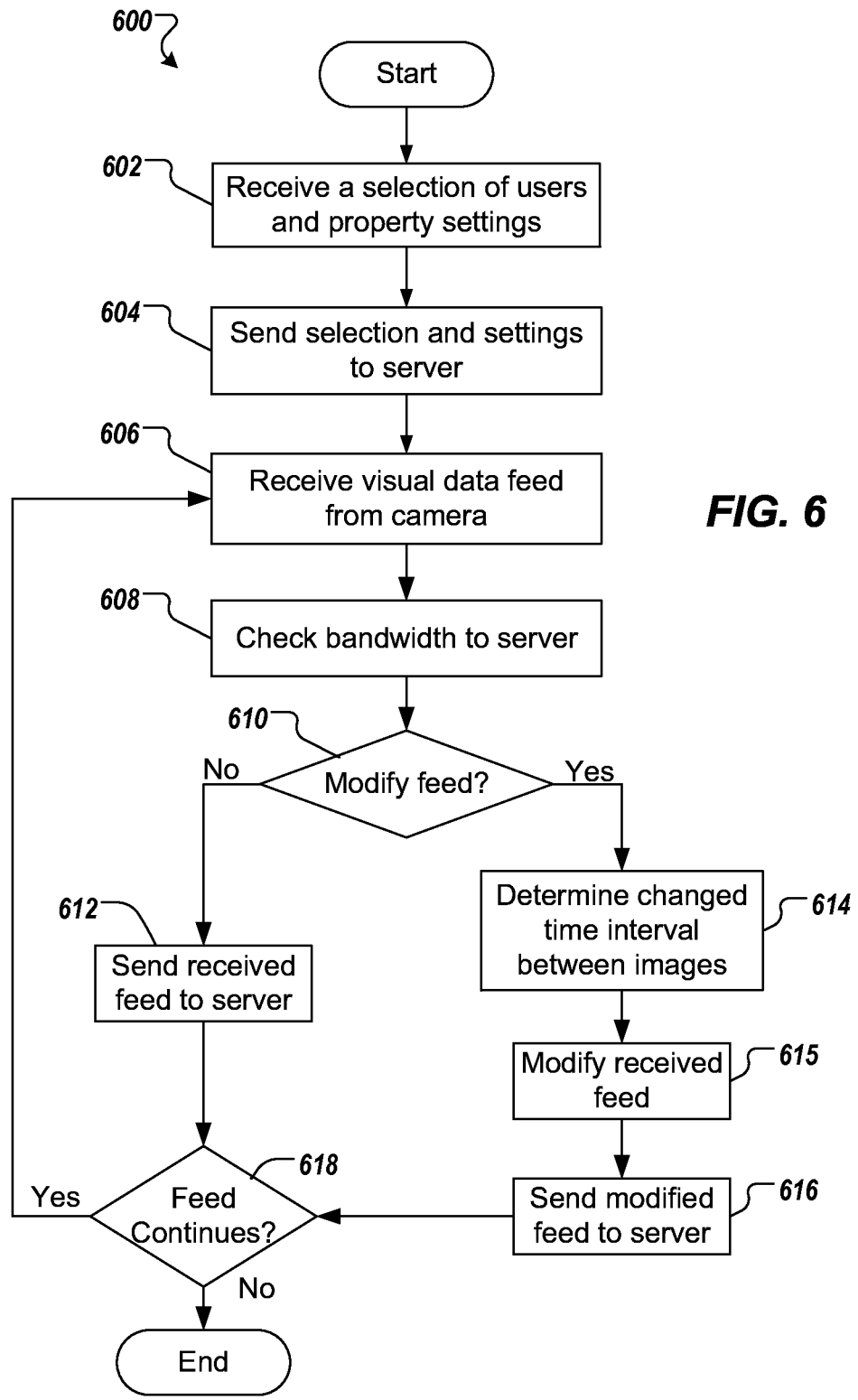
FIG. 6 is a flow diagram illustrating another example method that can be executed in some implementations of the present disclosure.

FIG. 6 is a flow diagram illustrating another example method 600 that can be executed in some implementations of the present disclosure. Method 600 can be implemented on software and/or hardware systems similarly as described for method 500 of FIG. 5. Method 600 can be implemented, for example, on a sending client device of the social networking system that can display a social networking interface on a display of the client device, and which can send a live streaming visual data feed to a server system (such as server system 112) providing a social networking service.

In block 602, a selection of users and property settings are received by the sending client device. In some examples, the user selection and settings can be input by a user into a social networking interface displayed by the client device, where the interface data has been received from a server of the social networking service, e.g., as a web page. The selection of users indicates the desired receiving client devices and users which can access the streaming visual data. In some implementations, the selection of users can be specified as one or more social groupings similarly as described above. The property settings can be specified as selections within the social networking interface to specify various characteristics of the streaming feed, such as times of broadcast and accessibility, channel(s) on which to broadcast the stream, locations in the social networking interface and service in which to broadcast the stream, methods of accessibility, etc., some examples of which are described above.

In block 604, the selection and settings can be sent over a network to a server system of the social networking service to instruct the service to receive the streaming visual data appropriately and to enable distribution of the stream according to the publishing user's settings and specifications. In other implementations, the server system can use previously-specified settings and selections.

In block 606, the sending client device receives visual data from a camera in communication with the sending client device. For example, the camera can communicate with the client device via a wireless connection or wire, and/or can be integrated in the client device. The visual data can be a stream or feed of one or more frames of visual data captured by a camera, for example.

In some examples, the camera can capture a video stream of data in a video content format. For example, the video data can include video frames, which can include individual visual data images or other data constructs. In some video implementations, a video frame may not form an individual or independent still image, and may include information processed to form images when played back. For example, some video frames may include only data indicating changes from one or more previous frames. In other examples, the camera can capture a stream of still images as still image frames of a still image data feed. For example, if the publishing user instructs the camera to capture a still image data stream and specifies a time interval, the camera can capture a still image frame after every time interval and provide the stream of still image frames. The still image frames are live since they are captured in ongoing real time. The visual data captured by the camera can be stored or buffered in memory or other storage of the client device.

In block 608, the client device checks the current bandwidth to the social networking server to which the streaming visual data is to be sent. In block 610, the process checks whether to modify the live visual data feed received from the camera. In some examples, the modification can include changing a time interval between successive frames of the visual data feed received from the camera. In some implementations the modification can include obtaining still images derived from a video feed received from the camera, where the still images are used to create a still image feed (or time lapsed still image feed). In some implementations, a time lapsed still image feed provides a series of still images at a display rate lower than the frame display rate of the video feed, i.e., a greater time interval between still image frames than between video frames, and/or fewer still image frames in the still image feed than video frames in the corresponding video feed. Some implementations can consider a still image as being a different content type than a video content type and can be treated differently by computing devices such as the server system and client devices. For example, the social network service may use particular software to display a video feed in its interface, and use other software to display still images. In other implementations, the still image feed is the same content type as a video feed but has a slower frame rate and time interval between frames than a standard frame rate of video used by the social networking system, e.g., where the still image frames are treated the same as video frames of a video feed and displayed using the same software and/or process.

The decision as to whether to modify the visual data feed can be based on one or more factors. One factor can be the currently available bandwidth over a network connection from the sending client device to the server system implementing the social network service. In one example, if the currently available bandwidth is below a particular predetermined threshold, then the time interval between frames should be set to a particular magnitude. In some cases the time interval can be increased, e.g., based on user property settings and/or if bandwidth is small or has been reduced due to network traffic or other conditions. In other cases the time interval can be decreased, e.g., based on user settings and/or if the bandwidth has increased relative to a previous condition. Multiple thresholds and/or bandwidth ranges can be used, each threshold or range being associated with a corresponding time interval between frames in the modified visual data feed.

In another example, if the current bandwidth is below a predetermined threshold, then a time lapsed still image feed can be sent, and if the bandwidth is above that threshold, then a video feed can be sent. The term "bandwidth" can include any number of factors influencing the timely transfer of data over a network connection, such as latency. In some implementations, if a different bandwidth is newly detected over a connection, the process need not immediately decide to change the time interval and/or amount of data being sent. For example, the system can monitor the network connection for a predetermined period of time (e.g., user configurable) while continuing to send the feed having the previous time interval between frames in the feed, and only decide to change the time interval (e.g., the amount of data sent) if the new amount of bandwidth persists longer than the predetermined period of time.

Whether a modification in the feed is needed can also be based on the form (e.g., video frames or still image frames) and time interval of the visual data feed received from the camera. Other factors that can be considered for modifying the visual data feed can include parameters provided by the publishing user, such as a command or indication to send a time lapsed image feed and/or particular time interval.

If the received visual data feed is decided to not to be modified in block 610, then the received visual data feed is sent to the server unmodified in block 612. In some examples, the sending client device (e.g., one of client devices 102-110) can stream the visual data feed received from the camera and stored in a memory buffer to the server system over the network, e.g., at the existing or standard video feed rate used by the camera and/or the social network service if the stream is a video feed, or at the existing frame rate of the received feed if the feed is a still image feed. The process then continues to block 618, as described below.

If the received visual data feed is decided to be modified in block 610, then in block 614 the process determines a different time interval to be provided between successive frames in the visual data feed. In some implementations, as described above, this time interval can be determined based on the currently available bandwidth over a network connection from the sending client device to a server system implementing the social network service. For example, the interval can be based proportionally on the current bandwidth that is under a particular threshold, with a longer interval provided for a smaller bandwidth. In another example, the social network service can determine a time interval that has been predetermined to be adequate for a particular bandwidth over a particular network connection. In another example, the system can test different data transfer rates and decide upon a time interval providing the maximum amount of data that incurs latency below a predetermined threshold. Other factors for determining a different time interval can include other network communication characteristics of the communication channel between client device and server system, where the worse the communication conditions, the longer the time interval used. In some implementations, property settings can affect the time interval determination, such as a setting provided by the publishing user that specifies or influences a particular time interval for the visual data feed to be sent.

In block 615, the process modifies the received visual data feed to provide the time interval determined in block 614. For example, if the received visual data feed from the camera is a video feed that needs to be modified into a time lapsed still image feed, then still image frames can be obtained from the video data, including processing or constructing still image frames from video frames if needed, to form the modified visual data feed. (In some implementations, such a received video feed can remain stored in memory of the client device and can be uploaded to the server system at a later time as a video file, if desired.) If the received visual data feed from the camera is a still image feed, then the modified feed can be created by omitting or deleting still image frames from the received feed to obtain the changed time interval, spacing apart existing still image frames with a different time interval, and/or copying new frames from existing frames and inserting the new frames in the stream if needed. In some implementations, the client device can also instruct the camera to start capturing images at the new time interval determined in block 614, so that in the future, the received visual data feed will already have the determined time interval between frames and need not be modified. Other modifications to the feed can also be performed in block 615, such as encoding or compressing of the data in the modified feed, sending control information within the feed to control its transmission or display, etc.

In block 616, the modified visual data feed is transmitted to the server system implementing the social network service. For example, the sending client device can stream the modified visual data from locations stored in a memory buffer of the client device to the server system over the network, as frames spaced by the time interval determined in block 614. In some implementations, control information can also be sent to the server indicating the type of content in the feed, e.g., video or still image.

In block 618, the process checks whether to continue sending a visual data feed to the server system. For example, this may be the case if the camera in communication with the client device continues to capture and provide data, the server system requests continuation of the feed and/or does not request its reception of the feed to be stopped, and/or other conditions are maintained. If the feed is to continue, the process returns to block 606 to receive additional visual data from the camera. If the feed is not to continue, the process is ended. The method 600 can also include multiple cameras and can send multiple feeds to the server system in some implementations, as described herein.

Figure 7:
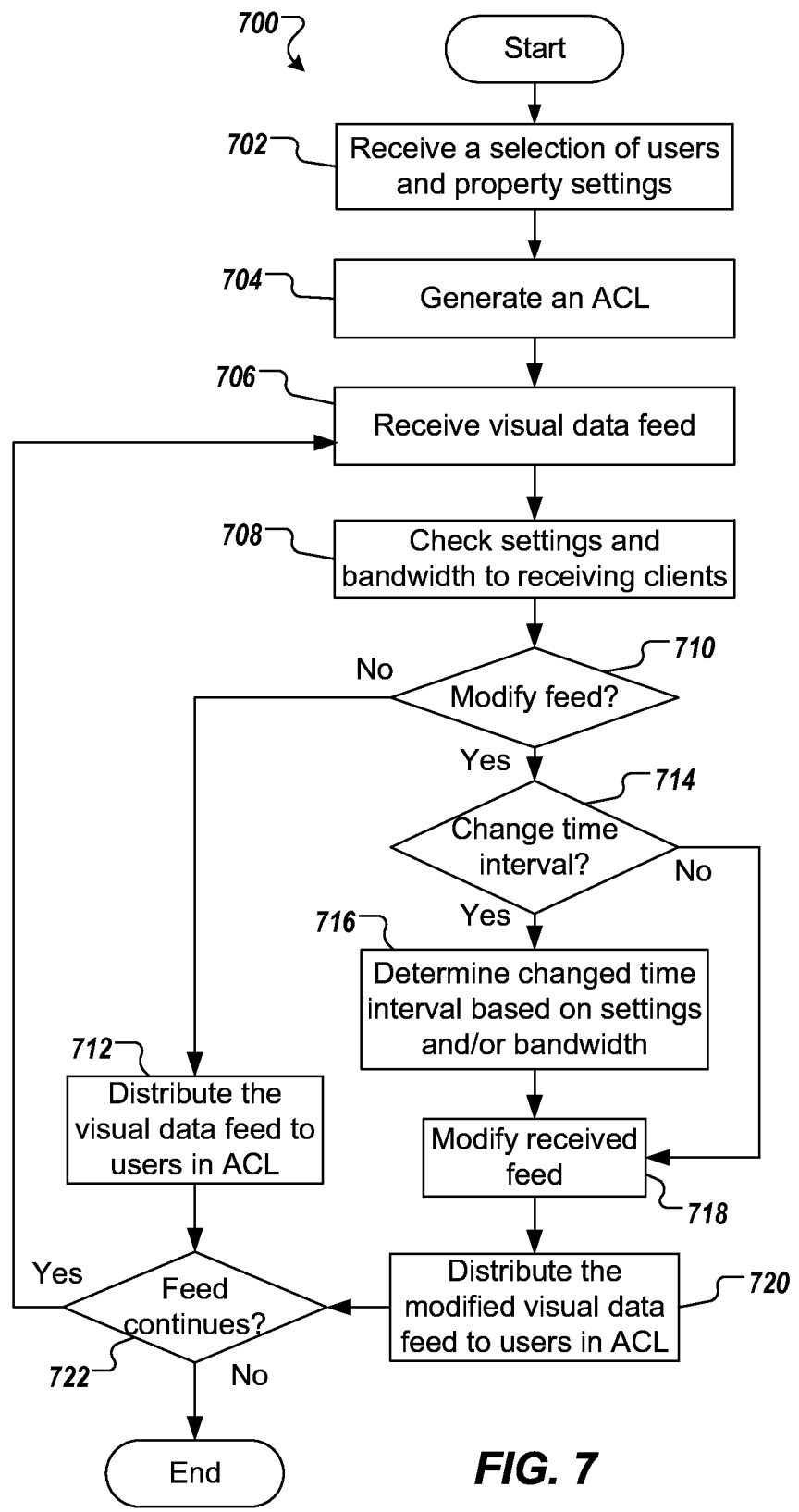
FIG. 7 is a flow diagram illustrating another example method that can be executed in some implementations of the present disclosure.

FIG. 7 is a flow diagram illustrating another example method 700 that can be executed in some implementations of the present disclosure. Method 700 can be implemented on software and/or hardware systems similarly as described for method 500 of FIG. 5. Method 700 can be implemented, in some examples, on a social networking server system which can receive a visual data feed from one or more client devices and distribute the feed to receiving client devices.

In block 702, the social networking service can receive a selection of one or more users to receive a visual data feed. Similar to method 500, in some examples these users can be selected by the publishing user and/or be accessing the social networking service to receive and view the visual data feed. In some implementations, the selected users can be included within a received ACL associated with the visual data feed. The service can also receive property settings associated with the visual data feed in block 702 (and/or in other blocks of method 700). For example, the property settings can be included within an item data set associated with the visual data feed. The property settings can affect the manner in which the visual data feed is provided to the one or more receiving users. The social networking service can receive the user selection and property settings via the social networking interface such as a social networking menu 302 as described above. Some examples can provide property settings previous to method 700 and accessible in user profile or account information, for example. In some implementations, in a block 704, the social networking service can generate the ACL including the selected one or more users to access or receive the visual data feed.

In a block 706, the social networking service can receive a live, streaming visual data feed from a sending client device, e.g., originating from a camera in communication with the sending client device. In some implementations or instances, the received visual data feed is a live video feed that includes a series of video frames is treated as video type of content data. In some implementations or instances, the received visual data feed is a live time lapsed image feed that includes a series of still image frames and is treated as an image content type. For example, some implementations of a social network interface may display video data with one type of program which can uncompress, decode, or otherwise process video type of data, and may display still image data with a different type of program that can decode, uncompress, or otherwise process still image type of data. Some implementations can treat the visual data feed always as one type of content, e.g., a video type having different frame rates and time intervals.

In a block 708, the process checks the property settings from users of client devices and the network bandwidth to each receiving client device. Property settings can include the publishing user's provided property settings received in block 702 (or at a previous time) to govern the distribution of the visual data feed, such as a user-specified time interval between frames. Furthermore, the settings can include settings provided by one or more receiving users. For example, one or more receiving users may have specified a display time interval between frames of the feed that is different than the time interval specified by the publishing user. For example, one or more of the receiving users may have specified a longer time interval between frames than the publishing user.

In a block 710, the process checks whether the received visual data feed should be modified before it is provided to receiving users. For example, the social networking service can determine whether one or more of the receiving users have specified a different desired display time interval between displayed still images of the feed than the time interval in the received visual data feed. This may cause the social networking system to insert increased time intervals between frames and/or remove some frames to provide the time intervals desired by a receiving user. In addition, the current bandwidth over the network between the server system and each receiving user can be checked, which may affect the time interval and cause the server system to modify the feed to insert longer time intervals and remove some frames if the bandwidth is too low.

If the feed is not to be modified, then the received visual data feed is distributed to the receiving client devices in block 712. The process then continues to block 722, as described below. If the feed is to be modified, then in block 712 the process checks whether the modification is to change the time interval in the feed between frames. In some cases the time interval can be increased, e.g., based on user settings and/or if bandwidth is small or has been reduced due to network traffic or other conditions. In other cases the time interval can be decreased, e.g., based on user settings and/or if the bandwidth has increased relative to a previous condition. For example, to provide a longer time interval between frames or images of the feed as instructed by a user's settings, some frames may be removed in the modified feed, reducing the amount of data in the feed. If the time interval in the feed is not to be changed, then in block 718 the process otherwise modifies the feed, as described below.

If the time interval of the feed is to be changed as determined in block 712, then in block 716, the process determines a changed time interval based on settings and/or bandwidth. Some implementations can look at user settings, in which the social network service determines a time interval that results from settings provided by receiving users. For example, a receiving user may have a preference indicating that incoming live video feeds should be displayed as live time lapsed still image feeds that update an image every five seconds rather than a video rate (such as 24 times per second). In some examples, if different receiving users have different specified time intervals and/or other settings, then the feed to each of those users can be individually modified for that user. Some implementations can check bandwidth conditions to the receiving client devices. For example, the social network service can determine a time interval that has been predetermined to be adequate for a particular bandwidth over a particular network connection. Or, the system can test different data transfer rates and decide upon a time interval providing the maximum amount of data that incurs latency below a predetermined threshold. Each feed to each receiving user's client device can be individually modified and individually sent based on the bandwidth conditions from the server system to that client device.

In some implementations, even if a new amount of bandwidth is detected over a connection that would trigger a data feed modification, the system need not immediately modify the feed being sent to receiving client devices. For example, the system can monitor the network connection for a predetermined period of time while continuing to send data having the current time interval between frames, and only change the time interval if the change in bandwidth persists longer than the predetermined period of time.

In block 718, the process can modify the received feed. In some examples, this can include providing a different time interval determined in block 716. For example, if the received visual data feed from the sending client device is a video feed that needs to be modified into a time lapsed still image feed, then still image frames can be obtained from the video data, including processing or constructing still image frames from video frames if needed, to form the modified visual data feed. (In some implementations, this received video feed can remain stored in memory of the server system and can be sent to any requesting client devices at a later time as a video file, if desired.) If the received visual data feed from the camera is a still image feed, then the modified feed can be created by omitting or deleting still image frames from the received feed to obtain the changed time interval, spacing apart existing still image frames with a different time interval, and/or copying new frames from existing frames and inserting the new frames in the stream if needed.

In still other examples, the received visual data feed from the sending client is a still image feed that needs to be modified into a video feed; e.g., one or more of the receiving client devices may have requested to be sent a video feed. In some implementations, the server system can modify the received feed by forming a video feed from the received still image frames and send the video feed to these receiving client devices. For example, the server system can insert the still image frames into the video feed and provide blank frames or copy existing still image frames into the video feed to obtain the desired video frame rate, if necessary. In some implementations, the server system can instruct the client device to process the feed at its end to provide the new time interval determined in block 716, so that in the future, the received visual data feed will already have the determined time interval between frames and need not be modified by the server system.

In some implementations, the system can perform modifications to the feed which are not a change of the time interval between frames. For example, such other modifications can be based on settings or current bandwidth, and can include sending control information within the feed to control its transmission or display, stopping or starting the sending of the feed or portions of the feed (or setting a flag or state to indicate to do so) based on a time schedule or other settings for the feed provided by the sending user and/or the receiving users; adjusting the display of the feed (color, brightness, other characteristics) to receiving users based on settings; setting the display of the feed to be in a particular area of the social network interface; encoding, decoding, compressing or decompressing the data in the data feed; etc.

In block 720, the social networking service can distribute the modified visual data feed over a network to the one or more users included in the ACL. For example, the social networking service can consult the ACL and property settings of blocks 702 and distribute the feed to receiving client devices based on this information. In some implementations the distribution can include multiple feeds, some or all of which may have different time intervals than each other and tailored to their particular receiving client device and user.

In some implementations, the server can wait for polling requests from one or more of the receiving client device(s) and respond by sending visual data to those client devices. For example, in some implementations one or more of the receiving client devices may be configured to display a time lapsed still image feed (e.g., based on user preferences at those client devices). Those client devices can send a request to the server system each time the client device wants the server to send an updated live still image frame in the feed to be displayed in the social networking interface of that client. In such an embodiment, if the received visual data feed of block 706 is a video feed, the server can obtain or convert still images from the video feed similarly as described above. In some implementations, if the server previously sent a video feed to the receiving client devices and then switches to sending a time lapsed image feed, control information can be sent with or prior to the changed feed to inform the receiving client devices to switch to displaying a time lapsed image type of feed.

In block 722, the process checks whether the feed is to continue being sent. For example, this may be the case if the sending client device continues to send data, receiving client devices request continuation of the feed and/or do not request sending of the feed to be stopped, and/or other conditions are maintained. If the feed is to continue, the process returns to block 706 to receive a next portion of the visual data feed (e.g., the next one or more frames of the sequential streaming data feed from the sending client device) in order to distribute that data in one or more feeds. If the feed is no longer to continue at block 720, the process ends.

It should be noted that the blocks described in the methods of FIG. 5-7 can be performed in a different order than shown and/or simultaneously (partially or completely) with other blocks, where appropriate. In some implementations, blocks can occur multiple times, in a different order, and/or at different times in the methods. Various forms of the flows shown above may be used, with steps re-ordered, added, or removed. In certain circumstances, multitasking and/or parallel processing may be advantageous.

In some implementations, variations of one or more above features can be used. For example, some implementations may provide server capability that can perform functions of the client devices described above. In some implementations, one or more of the client devices can perform one or more functions of the server system, instead of or in addition to the server performing those functions. For example, receiving client devices can determine whether to modify a feed before it is displayed and perform any modifications of the feed, instead of or in addition to the server system. Some implementations can provide and/or use visual data feeds that include both video frames and still image frames, e.g., in different portions of the feed or intermixed in the feed.

Figure 8:
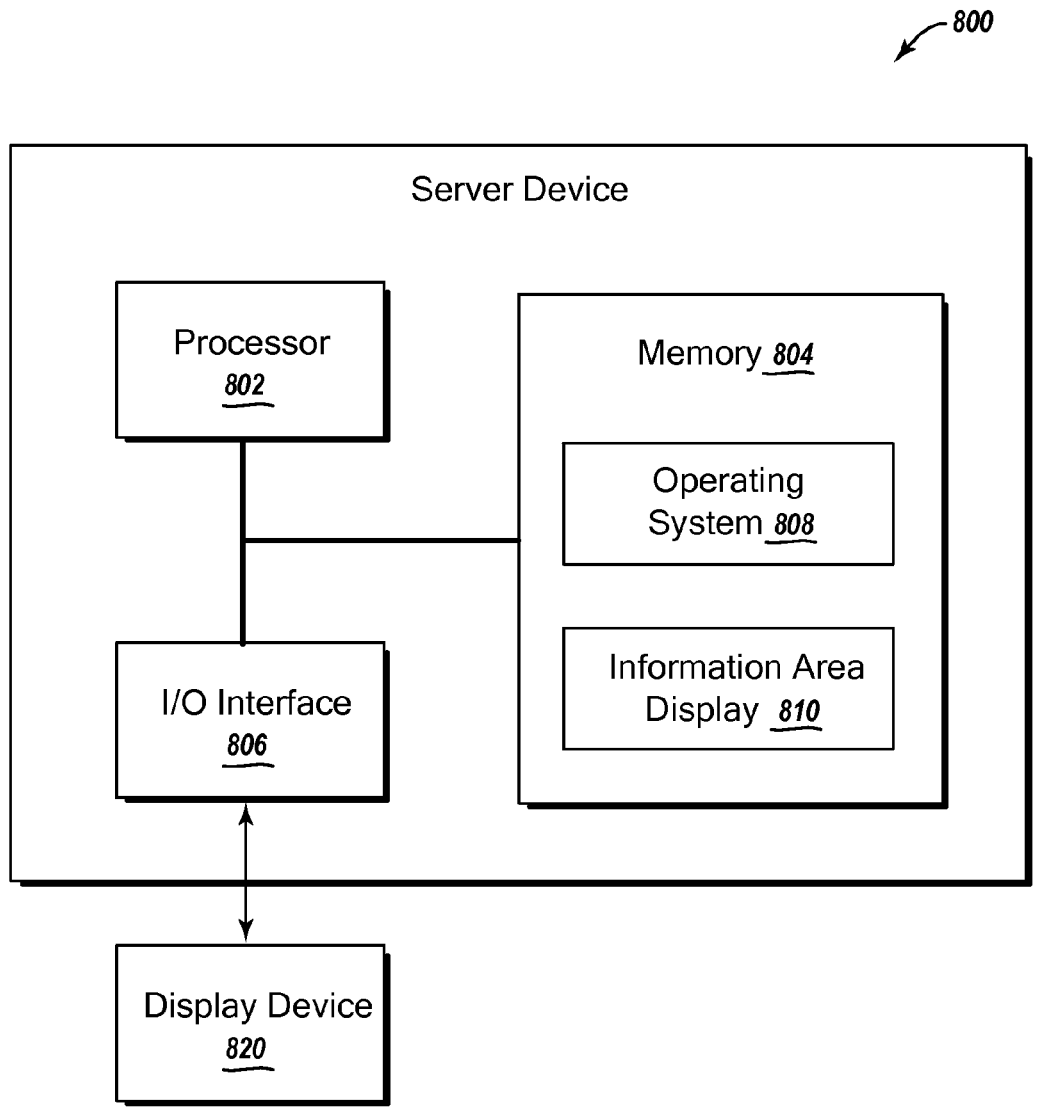
FIG. 8 is a block diagram of an example computing device which may be used for one or more implementations described herein.

FIG. 8 is a block diagram of an example server device 800, which may be used to implement some examples described herein. For example, server device 800 may be used to implement server system 112 of FIG. 1, and perform appropriate methods described herein. Server device 800 can be any suitable computer system, server, or other electronic or hardware device. For example, the server device 800 can be a mainframe computer, desktop computer, workstation, portable computer, or electronic device (portable device, cell phone, smart phone, tablet computer, television, TV set top box, personal digital assistant (PDA), media player, game device, etc.). In some implementations, server device 800 includes a processor 802, a memory 804, and input/output (I/O) interface 806.

Processor 802 can be one or more processors or processing circuits to execute program code and control basic operations of the server device 800. A "processor" includes any suitable programmable hardware and/or software system, mechanism or component that processes data, signals or other information and perform instructions. A processor may include a system with a general-purpose central processing unit (CPU), multiple processing units, dedicated circuitry for achieving functionality, or other systems, including special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in server device 800 for access by the processor 802, and may be any suitable processor-readable storage medium, including semiconductor memory devices such as random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808 and a social network engine 810. In some implementations, the social network engine 810 can include instructions that enable processor 802 to perform the functions described herein, e.g., some or all of the methods described above. Any of software in memory 804 can alternatively be stored on any other suitable storage device, location or computer-readable medium, including magnetic disks, e.g., internal hard disks or removable disks, magneto optical disks, and CD-ROM, DVD-ROM, and other disks. In addition, memory 804 (and/or other connected storage device(s)) can store the data of the visual data feeds, as well as property settings, interface data, other content, and other data used in the services and features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices such as memory and/or database 106, and input/output devices can communicate via interface 806. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 8 shows one block for each of processor 802, memory 804, I/O interface 806, and software blocks 808 and 810. These blocks may represent one or more processors or processing circuitries, operating systems, memories, I/O interfaces, applications, and/or software modules. In other implementations, server device 800 may not have all of the components shown and/or may have other elements including other types of elements instead of, or in addition to, those shown herein. While system 112 is described as performing blocks or steps as described in some implementations herein, any suitable component or combination of components of system 112 or similar system, or any suitable processor or processors associated with such a system, may perform the steps described.

A client device can also be used with features described herein, such as client devices 102-110 shown in FIG. 1. Example client devices can include some similar components as the server device 800, such as processor(s) 802, memory 804, and I/O interface 806. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text in ad/or describing the settings, notifications, and permissions.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of these. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of these.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The computing system can include clients and servers interconnected by any form or medium of digital data communication, e.g., a communication network. A client and server are generally remote from each other and typically interact through a communication network. The relationship of client and server arises by virtue of computer programs running on the respective computers and having a client-server relationship to each other. Described separate program components and systems can generally be integrated together in a single software product or packaged into multiple software products.

Although features have been described with respect to particular implementations, these particular implementations are merely illustrative, and not restrictive. Described specifics should not be construed as limitations on the scope of the disclosure or of what may be claimed. Features described in this disclosure can be provided in combination in single or multiple implementations separately or in any suitable subcombination. Concepts illustrated in the examples may be applied to other examples and implementations. It will be understood that various modifications may be made without departing from the spirit and scope of the disclosure.

What is claimed is:

1. A method comprising:
   receiving a selection of a plurality of users of a social networking service, the selection based on user input provided via a social networking interface;
   receiving a plurality of property settings via the social networking interface, wherein the plurality of property settings are associated with a received live visual data feed, and wherein the plurality of property settings include a start time and a stop time;
   receiving the received live visual data feed derived from a video camera, wherein the received live visual data feed includes a plurality of frames and has a time interval between successive frames;
   determining that the received live visual data feed should be modified based at least in part on settings provided by at least one of the selected plurality of users or at least one device associated with at least one of the selected plurality of users;
   determining a plurality of different modified visual feeds based on the received live visual data feed, wherein the modified visual feeds include a different time interval between their successive frames than the time interval between the successive frames of the received live visual data feed; and
   sending the different modified live visual data feeds over a network to respective social networking interfaces used by respective users of the selected plurality of users, wherein the sending of the different modified live visual data feeds is based at least in part on the property settings including the start time for starting the distribution of the modified live visual data feed to the respective social networking interfaces, and the stop time for ending the distribution.

2. A method comprising:
- receiving a selection of one or more users of a social networking service, the selection received via a social networking interface;
- receiving a plurality of property settings via the social networking interface, wherein the plurality of property settings are associated with a received live visual data feed, and wherein the plurality of property settings include a start time and a stop time;
- receiving the received live visual data feed, wherein the received live visual data feed includes a plurality of frames and has a time interval between successive frames;
- modifying the received live visual data feed to create a modified live visual data feed including a different time interval between its successive frames than the time interval between the successive frames of the received live visual data feed; and
- causing the modified live visual data feed to be sent over a network to be distributed to one or more social networking interfaces used by the one or more users of the social networking service, wherein the distribution of the modified live visual feed is based at least in part on the property settings including the start time for starting the distribution of the modified live visual data feed to the one or more social networking interfaces, and the stop time for ending the distribution.

3. The method of claim 2 wherein the received selection designates at least one social grouping of the social networking service, wherein the at least one social grouping includes at least one of the one or more users.

4. The method of claim 2 wherein the at least one social grouping is created by a publishing user of a client device that generates the received live visual data feed.

5. The method of claim 2 further comprising determining that the received live visual data feed should be modified based at least in part on the received property settings.

6. The method of claim 2 further comprising determining that the received live visual data feed should be modified based at least in part on bandwidth conditions detected over the network.

7. The method of claim 2 wherein the one or more users are a plurality of users, wherein modifying the received live visual feed includes determining a plurality of different modified visual feeds based on the received live visual feed, and
- wherein causing the modified live visual data feed to be sent over a network includes causing distribution of the different modified visual feeds to respective social networking interfaces used by respective users of the plurality of users.

8. The method of claim 2 wherein the property settings include a time interval at which the distribution to the one or more users is updated with a successive frame provided in the modified live visual feed for display to the one or more users.

9. The method of claim 2 wherein the received live visual data feed is provided from a camera and received by a client device, the client device sending the modified live visual data feed to a server system implementing the social networking service.

10. The method of claim 2 wherein the received live visual data feed is a live video feed in which the frames are video frames, and wherein the modified live visual data feed is a live time lapsed still image feed in which the frames are still image frames.

11. The method of claim 2 wherein the received live visual data feed is received by a server system over the network from a sending client device, wherein the server system sends the modified live visual data feed to be distributed to the one or more users.

12. The method of claim 2 wherein the received property settings are provided by at least one of:
- a publishing user originating the received live visual data feed, and
- the selected one or more users.

13. A system comprising:
- a computing device; and
- a non-transitory computer-readable medium coupled to the computing device and having instructions stored thereon which, when executed by the computing device, cause the computing device to perform operations comprising:
  - receiving a selection of one or more users of a social networking service, the selection received via a social networking interface;
  - receiving a plurality of property settings via the social networking interface, wherein the plurality of property settings are associated with a received live visual data feed, and wherein the plurality of property settings include a start time and a stop time;
  - receiving the received live visual data feed, wherein the received live visual data feed includes a plurality of frames and has a time interval between successive frames;
  - modifying the received live visual data feed to create a modified live visual data feed including a different time interval between its successive frames than the time interval between the successive frames of the received live visual data feed; and
  - causing the modified live visual data feed to be sent over a network to be distributed to one or more social networking interfaces used by the one or more users of the social networking service, wherein the distribution of the modified live visual feed is based at least in part on the property settings including the start time for starting the distribution of the modified live visual data feed to the one or more social networking interfaces, and the stop time for ending the distribution.

14. The system of claim 13 further comprising an operation of determining that the received live visual data feed should be modified based at least in part on the received property settings, and wherein the received property settings are provided by at least one of:
- a publishing user originating the received live visual data feed, and
- the selected one or more users.

15. The system of claim 13 wherein the one or more users are a plurality of users, wherein the operation of modifying the received live visual feed includes determining a plurality of different modified visual feeds based on the received live visual feed, and
- wherein the operation of sending the modified live visual data feed includes distributing the different modified visual feeds to respective social networking interfaces used by respective users of the plurality of users.

16. The system of claim 13 wherein the property settings include a time interval at which the distribution to the one or more users is updated with a successive frame provided in the modified live visual feed for display to the one or more users.

17. The system of claim 13 wherein the received live visual data feed is provided from a camera and received by a client device, the client device sending the modified live visual data feed to a server system implementing the social networking service.

18. The system of claim 13 wherein the received live visual data feed is received by a server system over the network from a sending client device, wherein the server system sends the modified live visual data feed to be distributed to the one or more users.

* * * * *